United States Patent [19]

Maeyama et al.

[11] Patent Number: 4,879,973
[45] Date of Patent: Nov. 14, 1989

[54] AUTOMATIC TUBE CIRCUMFERENCE SCANNING APPARATUS

[75] Inventors: Takuzo Maeyama; Kenichi Nii; Shigeru Shimojo, all of Osaka; Keiichi Iwamoto; Masaaki Torichigai, both of Nagasaki; Kiyoshi Koizumi, Tokyo, all of Japan

[73] Assignees: The Kansai Electric Power Co., Inc., Osaka; Mitsubishi Jukogyo Kabushiki Kaisha, Tokyo, both of Japan

[21] Appl. No.: 214,641

[22] Filed: Jul. 1, 1988

[30] Foreign Application Priority Data

Jul. 7, 1987 [JP] Japan .................. 62-164770

[51] Int. Cl.[4] ............................................. F22B 37/42
[52] U.S. Cl. ...................................... 122/379; 122/504; 165/11.2
[58] Field of Search ............... 122/379, 504; 165/11.1, 165/11.2, 76

[56] References Cited

U.S. PATENT DOCUMENTS

| 4,508,063 | 4/1985 | Monne ................................. | 122/504 |
| 4,515,747 | 5/1985 | Creek et al. ................... | 165/11.1 X |
| 4,702,878 | 10/1987 | Klug et al. ...................... | 165/11.2 X |
| 4,729,423 | 3/1988 | Martin ............................. | 165/11.1 X |
| 4,757,258 | 7/1988 | Kelly, Jr. et al. ............. | 165/11.2 X |

Primary Examiner—Steven E. Warner
Attorney, Agent, or Firm—Wenderoth, Lind & Ponack

[57] ABSTRACT

An automatic tube circumference scanning apparatus automatically performs inspections, repairs and other operation on a group of tubes arrayed in a narrow space and extending in horizontal directions. The apparatus includes an upper support/traverse section mounted on an upper tube in the group of tubes so as to be able to travel along a tube axis and to stop and grip the upper tube, a lower support/traverse section mounted on a lower tube so as to be able to travel, stop and grip the lower tube, a flexible rail extending vertically between the upper and lower support/traverse sections and fixed thereto, and a probe scanning section mounted on the flexible rail so as to be able to move up and down and which grips any arbitrary tube between the aforementioned upper and lower tubes for making a probe scan around such tube.

2 Claims, 6 Drawing Sheets

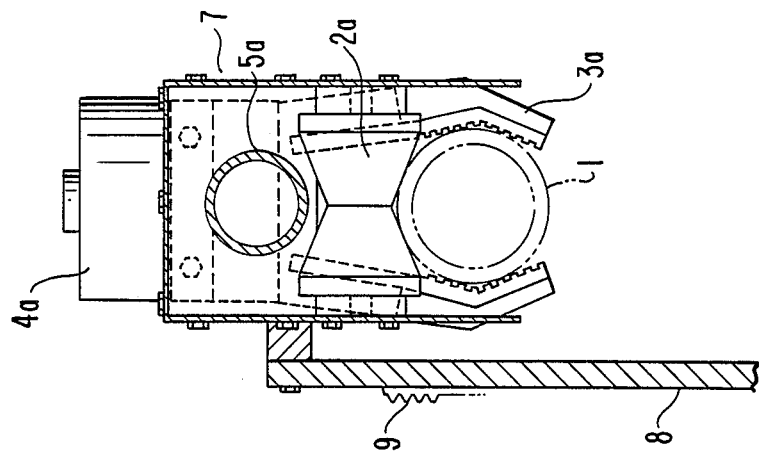
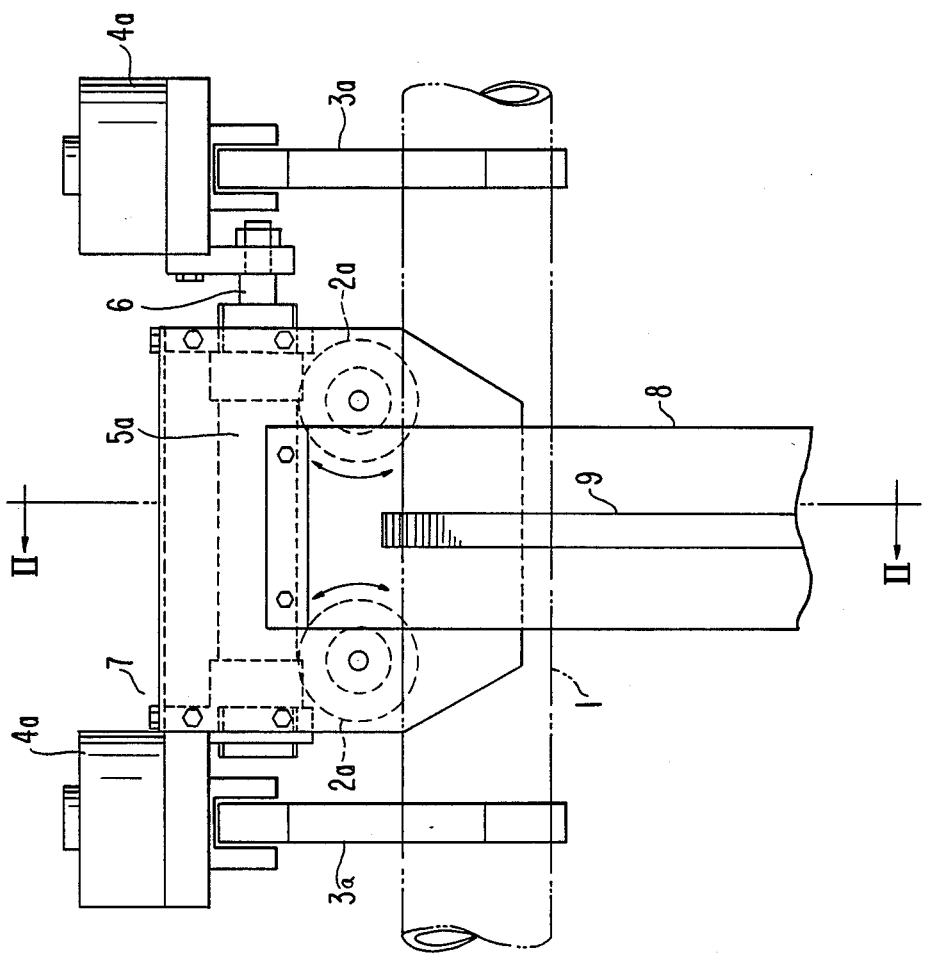

AUTOMATIC TUBE CIRCUMFERENCE SCANNING APPARATUS

BACKGROUND OF THE INVENTION

1. Field of the Invention

The present invention relates to an automatic tube circumference scanning apparatus that is suitable for use in a system for inspecting, repairing and cleaning horizontal tube groups, especially superheaters and reheater tubes in a boiler.

2. Description of the Prior Art

Regarding boilers for use in a power plant, in Japan it is obliged to perform routine inspections according to the Electrical Enterprise Law, and since it is necessary to stop operation of a boiler when a routine inspection of the boiler is carried out, it is a common practice to perform inspections and repairs other than the routine inspection items coincidently with the routine inspection. Among these other inspections and repairs, the inspection and repair of boiler superheater tubes are carried out by workers after setting up a scaffold.

The state of inspection and repair of the interior of a boiler is shown in FIG. 9 which is a longitudinal cross-sectional view, and in FIG. 10 which is a perspective view of a part encircled by line X in FIG. 9. In these figures, materials for setting up a scaffold are carried into a furnace c through a hopper b of a boiler a and a scaffold d is set up in the furnace. In this case, since the carry-in port for materials is limited to a narrow space such as the hopper b, the materials to be carried in must be formed as small as the size of the carry-in port, and also since introduction of a machine into the furnace is impossible, the setting-up within the furnace must entirely rely upon human labor, so that setting-up of the scaffold d necessitates a long period of time.

In addition, in the case where heat transfer tubes e are arrayed in the horizontal directions, workers conduct measurement and inspections while being positioned in a space between the tubes. Hence, the precision of such measurements is lowered due to bad environmental working conditions. Also, there are many places where measurements are impossible due to the narrow space, and reliability of the measurements is poor.

SUMMARY OF THE INVENTION

The present invention has been developed in view of the above-mentioned background of prior art, and one object of the invention is to provide an automatic tube circumference scanning apparatus which can automatically perform inspections and operations on a group of tubes arrayed in a narrow space and extending in horizontal directions, which can realize reduction of labor required for such inspections and operations, and also which can enhance precision and can achieve improvements in reliability.

According to one feature of the present invention, there is provided an automatic tube circumference scanning apparatus comprising an upper support/traverse section mounted on an upper tube in a group of tubes arrayed in horizontal directions so as to be able to travel along a tube axis and to stop and grip the tube. A lower support/traverse section is mounted on a lower tube spaced from the upper tube so as to be able to traverse, stop and grip said tower tube. A flexible rail extends vertically between the upper and lower support/traverse sections and is fixed thereto. A probe scanning section is mounted on the rail so as to be able to move up and down, and grips any selected tube between the upper and lower tubes and makes a probe scan around such selected tube.

According to the present invention, owing to the above-featured novel construction, the automatic circumference scanning apparatus can automatically perform inspections and operations on a group of tubes arrayed within a narrow space and directed in horizontal directions. Hence, reduction of the labor required for the inspections and operations can be realized, also precision of the inspections and operations can be enhanced, and improvements in reliability of the inspections and operations can be achieved.

The above-mentioned and other objects, features and advantages of the invention will become more apparent by reference to the following description of one preferred embodiment of the invention taken in conjunction with the accompanying drawings.

BRIEF DESCRIPTION OF THE DRAWINGS

In the accompanying drawings:

FIGS. 1 and 2 illustrate an upper support/traverse section included in a tube wall thickness measuring system for horizontal type superheater tubes in a fired boiler according to one preferred embodiment of the present invention, FIG. 1 being a front view, and FIG. 2 being a longitudinal cross-sectional view taken along line II—II in FIG. 1;

DESCRIPTION OF THE PREFERRED EMBODIMENT

Figure 3:
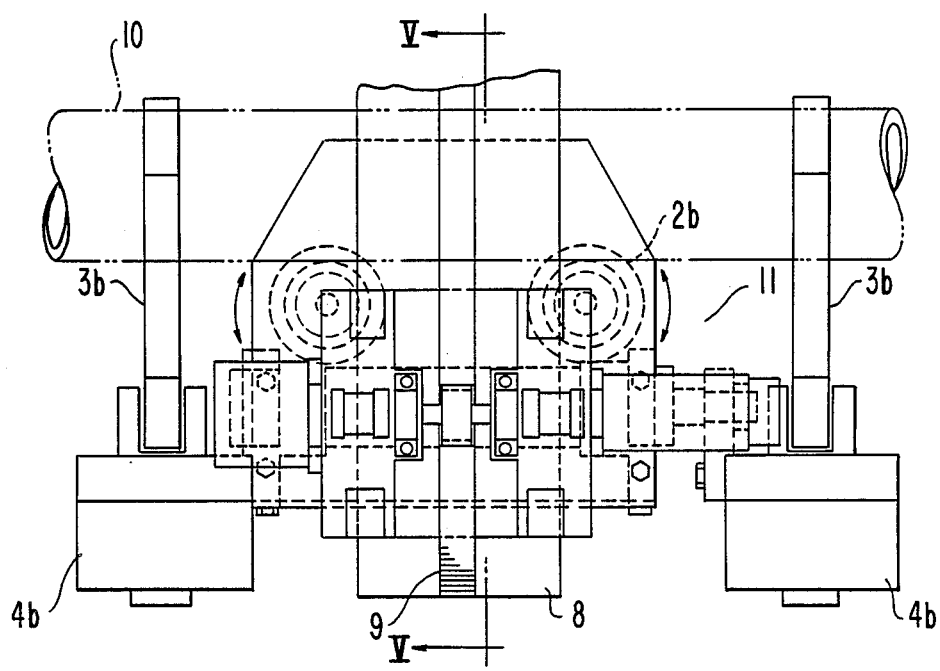
FIGS. 3 to 5 illustrate a lower support/traverse section included in the same tube wall thickness measuring system, FIG. 3 being a front view, FIG. 4 being a plan view, and FIG. 5 being a longitudinal cross-sectional view taken alone line V—V in FIG. 3.

Referring now to FIGS. 1 and 2, an upper support/traverse section 7 is shown in the position where guide rollers 2a are placed on the uppermost superheater tube 1 in a horizontal type superheater and chucking fingers 3a are gripping the uppermost superheater tube 1. These chucking fingers 3a are opened and closed by making use of a pneumatic pressure. In addition, two air members 4a supporting chucking fingers 3a are connected via respective arms 6 to an air cylinder 5a, and thereby traverse in the left and right directions as viewed in FIG. 1 is made possible.

Also, a flexible rail 8 is fixedly secured to the upper support/traverse section 7 and is suspended therefrom.

Figure 4:
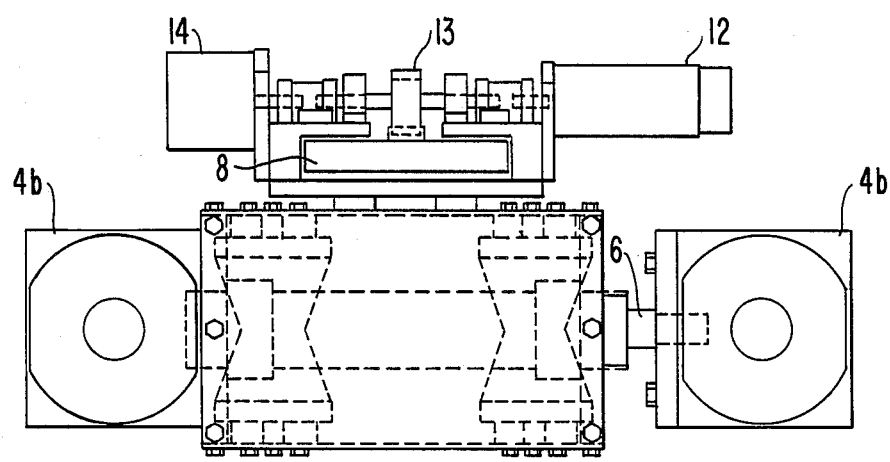
Figure 5:
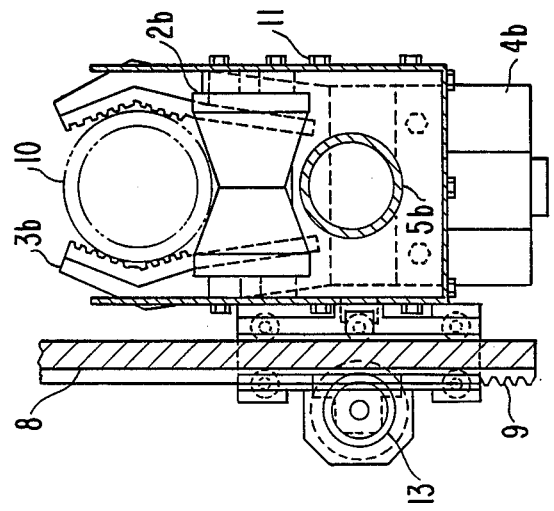

FIGS. 3 to 5 show a lower support/traverse section 11 mounted to the lowermost superheater tube 10 in the horizontal type superheater via guide rollers 2b and chucking fingers 3b. In this section also, air members 4b for opening and closing the chucking fingers 3b and an air cylinder 5b for moving the chucking fingers 3b are provided. To this lower support/traverse section 11 is mounted the bottom end of the flexible rail 8, and a tension motor 12 for tensioning rail 8 and a gear 13 operatively coupled to the motor 12, as well as an electromagnetic brake 14 for stopping the tension motor 12 under a condition where a predetermined tension has been applied to the rail 8, are provided in association with the lower support/traverse section 11.

Figure 6:
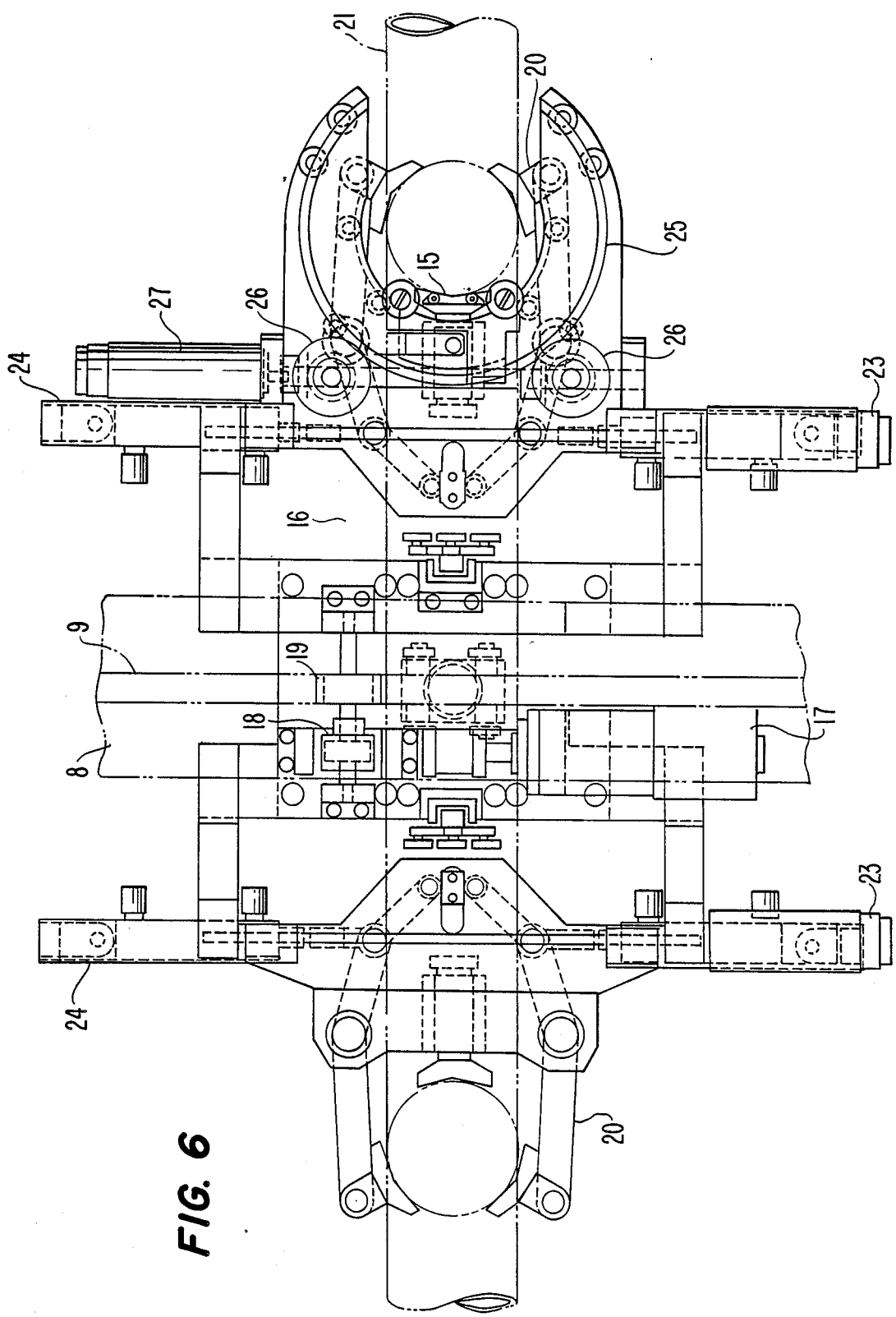

FIG. 6 shows a probe scanning section 16, having mounted thereon a supersonic probe 15 for measuring a tube wall thickness, mounted, in a vertically movable manner, on the flexible rail 8 that extends vertically between the upper support/traverse section 7 and the lower support/traverse section 11. This probe scanning section 16 is provided with a motor 17 for vertical movement, and also is provided with a gear 19 that is coupled with the motor 17 via a bevel gear 18. Gear 19 meshes with a rack 9 fixedly secured to the flexible rail 8, and thereby the probe scanning section 16 can be moved up and down. Furthermore, probe scanning section 16 is associated with two chucking sections 20 on the left and on the right, respectively, which sections are adapted to grip a tube 21 to be inspected that is located between the uppermost tube 1 and the lowermost tube 10.

Figure 7:
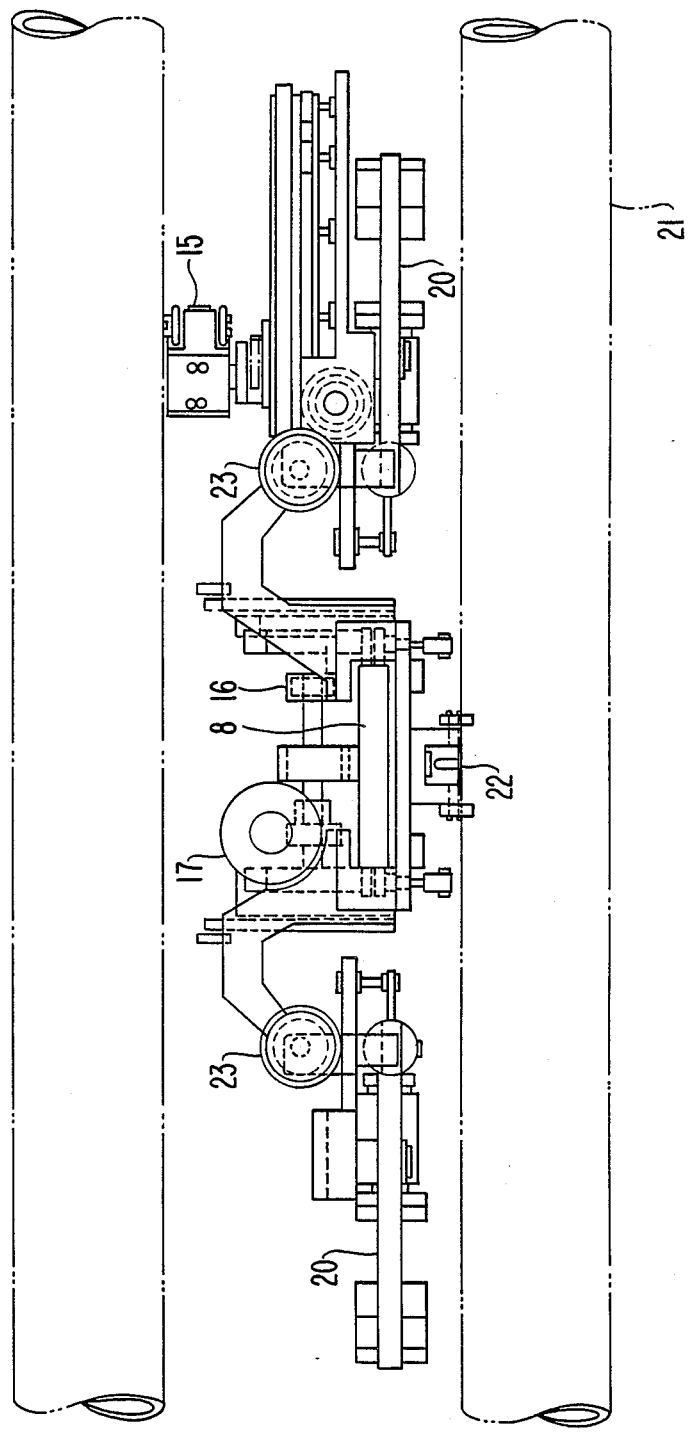
Figure 9:
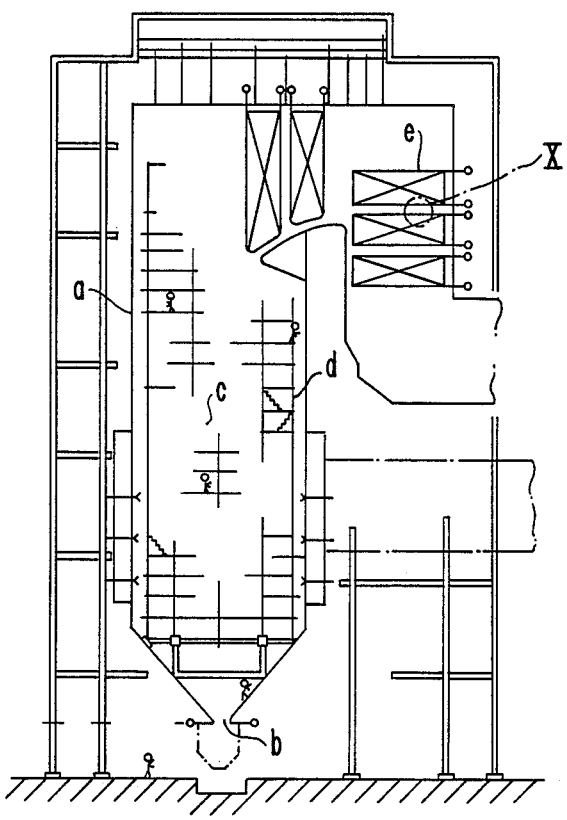
FIGS. 9 and 10 illustrate the states of inspection and repair within a boiler according to the prior art, FIG. 9 being a longitudinal cross-sectional view, and FIG. 10 being a perspective view showing one portion encircled by line X in FIG. 9.
Figure 10:
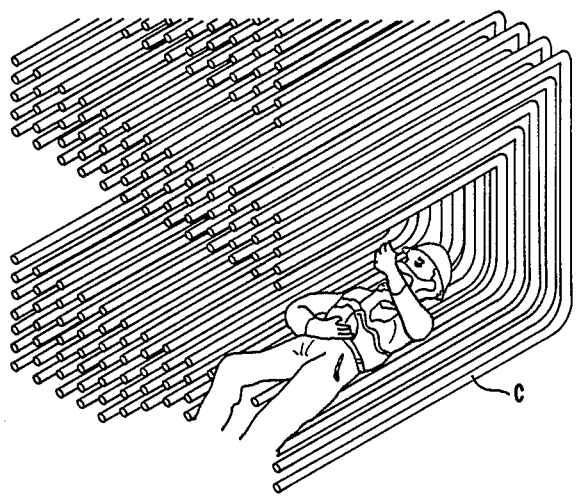

Referring now to FIG. 7, the probe scanning section 16 is associated with a tube sensor 22 which can detect a center of a tube diameter of the tube 21 to be inspected while moving in the vertical directions. When tube sensor 22 detects the center of the tube diameter of the tube 21 to be inspected, the motor 17 for vertical movement is momentarily stopped.

Subsequently, turning motors 23 for turning the left and right chucking sections 20 by 90° are actuated. Successively, air cylinders 24 for closing the chucking sections 20 are actuated to fixedly secure the probe scanning section 16 to the tube 21 to be inspected.

As shown in FIG. 6, supersonic thickness probe 15 is loaded on a horseshoe-shaped rail 25 mounted to one of the chucking sections 20. On the outside of the rail 25 is cut a rack, which is meshed with two gears 26. These gears 26 are rotationally driven by a probe revolving motor 27, hence the horseshoe-shaped rail 25 meshed with these gears 26 revolves around the tube 21 to be inspected with the supersonic thickness probe 15 kept loaded thereon, and thereby the wall thickness of the tube 21 can be measured.

Figure 8:
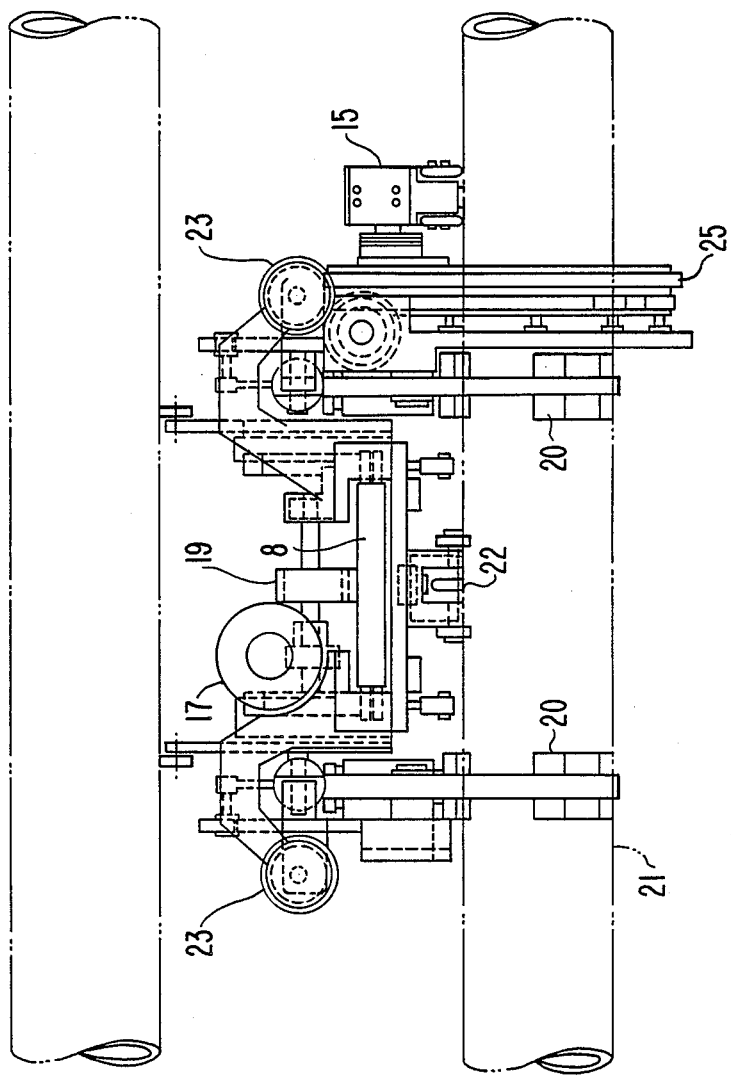
FIGS. 6 to 8 illustrate a probe scanning section included in the same tube wall thickness measuring system, FIG. 6 being a front view, FIG. 7 being a plan view, and FIG. 8 being a plan view but shown in a chucking position.

When the measurement has been finished, the air cylinders 24 are actuated, and thereby the chucking sections 20 are opened. Then the turning motors 23 are actuated and thereby the chucking sections 20 are returned from the state shown in FIG. 8 to the state shown in FIG. 7. Thereafter, the motor 17 for vertical movement is actuated to transfer the probe scanning section 16 to the next tube to be inspected.

While the movement in the left and right direction has been described as being accomplished by the air cylinders 5a and 5b in the above explanation, the upper and lower support/traverse sections 7 and 11 could be moved by making use of motor-driven rollers.

In addition, while explanation has been made in connection with an example of tube wall thickness measurement in the above-described embodiment, it also is possible for the probe scanning section to be loaded with various working apparatuses such as a contour measuring apparatus, a penetrative defect hunting apparatus, a fiberscope or a cleaning apparatus, and to be subjected to similar operations to perform desired measurements and operations.

In essence, according to the present invention, owing to the provision of an upper support/traverse section mounted on an upper tube among a group of tubes arrayed in horizontal directions so as to be able to travel along a tube axis and to stop and grip said upper tube, a lower support/traverse section mounted on a lower tube appropriately spaced from the upper tube so as to be able to travel, stop and grip said lower tube, a flexible rail extended vertically between the upper and lower support/traverse sections and fixed thereto, and a probe scanning section mounted on the rail so as to be able to move up and down, which grips any arbitrary tube between the upper and lower tubes to perform a probe scan around such tube, there is provided an automatic tube circumference scanning apparatus, with which inspections and operations of a group of tubes arrayed in a narrow space in horizontal directions can be performed automatically. Hence, reduction of labor necessitated for the inspections and operations can be realized, also precision of the inspections and operations can be enhanced, and improvements in reliability of the inspections and operations can be achieved, and therefore, the present invention is industrially very useful.

Since many changes and modifications can be made to the above-described construction without departing from the scope of the present invention, it is intended that all matter contained in the above-description and illustrated in the accompanying drawings shall be interpreted to be illustrative and not as a limitation to the scope of the invention.

What is claimed is:

1. An automatic tube circumference scanning apparatus comprising an upper support/traverse section mounted on an upper tube in a group of tubes arrayed as directed in the horizontal directions so as to be able to travel along a tube axis and to stop and grip said upper tube, a lower support/traverse section mounted on a lower tube appropriately separated from said upper tube so as to be able to travel, stop and grip said lower tube, a flexible rail extended vertically between said upper and lower support/traverse sections and fixed thereto, and a probe scanning section mounted on said rail so as to be able to move up and down, which grips any arbitrary tube between said upper and lower tubes for making a probe scan around the same tube.

2. An automatic tube circumference scanning apparatus as claimed in claim 1, wherein said probe scanning section is mounted on a horseshoe-shaped rail which is mounted on a chucking portion for a tube and can rotate about the tube.

* * * * *